(12) United States Patent
Komatsubara

(10) Patent No.: US 12,007,007 B2
(45) Date of Patent: Jun. 11, 2024

(54) DRIVE CONTROL DEVICE

(71) Applicant: Honda Motor Co., Ltd., Tokyo (JP)

(72) Inventor: Masaru Komatsubara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 197 days.

(21) Appl. No.: 17/743,452

(22) Filed: May 13, 2022

(65) Prior Publication Data

US 2022/0389996 A1 Dec. 8, 2022

(30) Foreign Application Priority Data

Jun. 4, 2021 (JP) ................................ 2021-094825

(51) Int. Cl.
| | |
|---|---|
| *F16H 48/20* | (2012.01) |
| *B60K 17/34* | (2006.01) |
| *B60K 23/08* | (2006.01) |
| *B60W 30/182* | (2020.01) |

(52) U.S. Cl.
CPC ............. *F16H 48/20* (2013.01); *B60K 17/34* (2013.01); *B60K 23/08* (2013.01); *B60W 30/182* (2013.01); *F16H 2048/204* (2013.01)

(58) Field of Classification Search
CPC ......... F16H 48/20; B60K 17/34; B60K 23/08; B60K 23/0808
See application file for complete search history.

(56) References Cited

U.S. PATENT DOCUMENTS

| | | |
|---|---|---|
| 5,819,194 A | 10/1998 | Hara et al. |
| 7,374,255 B2 | 5/2008 | Mori |
| 2014/0297145 A1* | 10/2014 | Nihanda ............ B60K 23/0808 701/69 |
| 2016/0280064 A1* | 9/2016 | Nozu ...................... F16D 48/06 |
| 2019/0263392 A1* | 8/2019 | Imamura ............ B60K 23/0808 |

FOREIGN PATENT DOCUMENTS

| | | |
|---|---|---|
| JP | H03258620 | 11/1991 |
| JP | 2003312293 | 11/2003 |
| JP | 2006056384 | 3/2006 |
| JP | 2008144788 | 6/2008 |
| JP | 2014189253 | 10/2014 |

OTHER PUBLICATIONS

"Office Action of Japan Counterpart Application" with English translation thereof, issued on Apr. 4, 2023, p. 1-p. 13.

* cited by examiner

*Primary Examiner* — George C Jin
(74) *Attorney, Agent, or Firm* — JCIPRNET

(57) ABSTRACT

A drive control device includes: an estimated longitudinal acceleration acquisition part acquiring an estimated longitudinal acceleration of a vehicle based on an estimated driving force of the vehicle and a wheel speed of main drive wheels of the vehicle; an estimated lateral acceleration acquisition part acquiring an estimated lateral acceleration of the vehicle; an estimated tire load calculation part calculating an estimated tire load of the main drive wheels based on the estimated longitudinal acceleration and the estimated lateral acceleration; and a drive mode selection part selecting one of a two-wheel drive mode driven only by the main drive wheels and a four-wheel drive mode driven by both the main drive wheels and auxiliary drive wheels. When the estimated tire load calculated by the estimated tire load calculation part is lower than a two-wheel drive threshold value, the drive mode selection part selects the two-wheel drive mode.

16 Claims, 12 Drawing Sheets

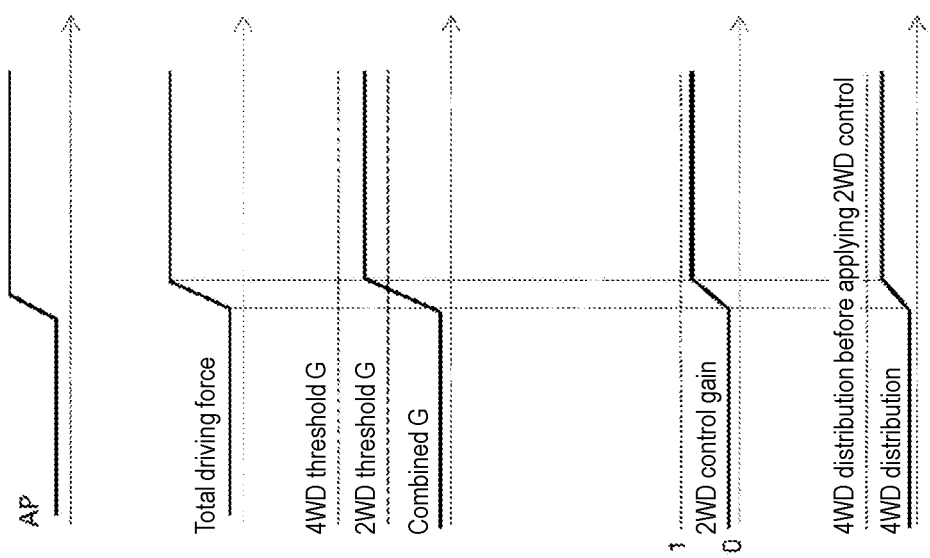

DRIVE CONTROL DEVICE

CROSS-REFERENCE TO RELATED APPLICATION

This application claims the priority benefit of Japan application serial no. 2021-094825, filed on Jun. 4, 2021. The entirety of the above-mentioned patent application is hereby incorporated by reference herein and made a part of this specification.

BACKGROUND

Technical Field

The disclosure relates to a drive control device.

Related Art

A device for switching between two-wheel drive and four-wheel drive by adjusting a driving force distribution between front wheels and rear wheels of a vehicle is known. For example, Patent Document 1 (Japanese Patent Application Laid-Open No. 2014-189253) discloses a device which calculates a tire load of the front wheels based on an estimated driving force and a steering angle of the vehicle, and selects the two-wheel drive when the calculated tire load is relatively low and selects the four-wheel drive when the tire load is relatively high.

However, under a heavy load condition such as during towing traveling, fuel efficiency easily deteriorates and temperature of each part of the vehicle easily rises. Therefore, there is a tendency to expand a region for selecting the two-wheel drive in order to suppress deterioration of fuel efficiency or temperature rise of each part of the vehicle. On the other hand, from the viewpoint of improving the traveling performance and steering stability of the vehicle, there is a demand to select the four-wheel drive as much as possible. Therefore, it is desired to quickly switch to the four-wheel drive depending on the situation while securing a wide region for selecting the two-wheel drive.

SUMMARY

A drive control device (1) according to an aspect of the disclosure includes an estimated longitudinal acceleration acquisition part (10), an estimated lateral acceleration acquisition part (11), an estimated tire load calculation part (12), and a drive mode selection part (13). The estimated longitudinal acceleration acquisition part (10) acquires an estimated longitudinal acceleration of a vehicle based on an estimated driving force of the vehicle and a wheel speed of main drive wheels of the vehicle. The estimated lateral acceleration acquisition part (11) acquires an estimated lateral acceleration of the vehicle. The estimated tire load calculation part (12) calculates an estimated tire load of the main drive wheels based on the estimated longitudinal acceleration acquired by the estimated longitudinal acceleration acquisition part (10) and the estimated lateral acceleration acquired by the estimated lateral acceleration acquisition part (11). The drive mode selection part (13) selects one of a two-wheel drive mode driven only by the main drive wheels and a four-wheel drive mode driven by both the main drive wheels and auxiliary drive wheels in the vehicle. When the estimated tire load calculated by the estimated tire load calculation part (12) is lower than a two-wheel drive threshold value, the drive mode selection part (13) selects the two-wheel drive mode in the vehicle.

According to the drive control device (1), the estimated longitudinal acceleration of the vehicle is acquired based on not only the estimated driving force of the vehicle but also the wheel speed of the main drive wheels. Then, when the estimated tire load of the main drive wheels acquired by combining the estimated longitudinal acceleration with the estimated lateral acceleration is lower than the two-wheel drive threshold value, the two-wheel drive is selected. That is, when the estimated driving force of the vehicle is relatively small and, for example, a situation such as slipping of the main drive wheels does not occur, the two-wheel drive is selected. In other words, even when the estimated driving force of the vehicle is relatively small, the four-wheel drive is selected, for example, in a situation such as slipping of the main drive wheels. Therefore, it is accurately determined whether the two-wheel drive should be selected or the four-wheel drive should be selected. As a result, it is possible to quickly switch from the two-wheel drive to the four-wheel drive depending on the situation.

In the drive control device (1) according to an aspect of the disclosure, when the estimated tire load calculated by the estimated tire load calculation part (12) exceeds a four-wheel drive threshold value, the drive mode selection part (13) may select the four-wheel drive mode in the vehicle. Accordingly, even when the estimated driving force of the vehicle is relatively small, the four-wheel drive is selected, for example, in a situation such as slipping of the main drive wheels. Therefore, the above actions and effects of the drive control device (1) are suitably exerted.

In the drive control device (1) according to an aspect of the disclosure, each of the two-wheel drive threshold value and the four-wheel drive threshold value may constitute a friction circle. Accordingly, the drive control device (1) which exerts the above actions and effects is concretely realized.

In the drive control device (1) according to an aspect of the disclosure, the estimated longitudinal acceleration acquisition part (10) may acquire, as the estimated longitudinal acceleration, a larger value between longitudinal accelerations of the vehicle respectively calculated from the estimated driving force and the wheel speed. Accordingly, even when the estimated driving force of the vehicle is relatively small, the four-wheel drive is more reliably selected, for example, in a situation such as slipping of the main drive wheels.

The drive control device (1) according to an aspect of the disclosure may include a sudden acceleration determination part (14) which determines whether the vehicle is about to accelerate suddenly based on the estimated driving force. When the sudden acceleration determination part (14) determines that the vehicle is about to accelerate suddenly, the drive mode selection part (13) may be prohibited from selecting the two-wheel drive mode in the vehicle. Accordingly, it is possible to more reliably select the four-wheel drive during sudden acceleration, which is a situation requiring higher traveling performance and steering stability.

In the drive control device (1) according to an aspect of the disclosure, the sudden acceleration determination part (14) may determine whether the vehicle is about to accelerate suddenly based on a differential value of a longitudinal acceleration of the vehicle calculated from the estimated driving force. Accordingly, it is possible to accurately determine whether the vehicle is about to accelerate suddenly.

The drive control device (1) according to an aspect of the disclosure may include a characteristic mode selection part

(15) which selects one of a normal mode that realizes a normal traveling characteristic and a non-normal mode that realizes a traveling characteristic different from a traveling characteristic of the normal mode in the vehicle. When the non-normal mode is selected by the characteristic mode selection part (15), the drive mode selection part (13) may be prohibited from selecting the two-wheel drive mode in the vehicle. Accordingly, it is possible to more reliably select the four-wheel drive when a traveling characteristic different from the normal traveling characteristic is applied.

The drive control device (1) according to an aspect of the disclosure may include a front-limited slip differential (LSD) operation determination part (16) which determines whether a front-rear LSD (4) is operating in the vehicle. When it is determined by the front-rear LSD operation determination part (16) that the front-rear LSD (4) is operating, the drive mode selection part (13) may be prohibited from selecting the two-wheel drive mode in the vehicle. Accordingly, it is possible to more reliably select the four-wheel drive when the front-rear LSD (4) is operating, which is a situation requiring higher traveling performance and steering stability.

In the drive control device (1) according to an aspect of the disclosure, in the four-wheel drive mode, a torque distributed to the auxiliary drive wheels among the main drive wheels and the auxiliary drive wheels may be equal to or higher than a preset minimum torque. Accordingly, it is easy to maintain sufficient traveling performance and steering stability when the four-wheel drive is selected.

In the drive control device (1) according to an aspect of the disclosure, the main drive wheels may be front wheels, and the auxiliary drive wheels may be rear wheels. Accordingly, in a vehicle that realizes the four-wheel drive by also driving the rear wheels on the basis of the two-wheel drive which is based on front-wheel drive, the drive control device (1) which exerts the above actions and effects is concretely realized.

The reference signs in the above parentheses indicate, as an example of the disclosure, the reference signs of the components in the embodiments to be described later, and do not limit the disclosure to the embodiments.

As described above, the drive control device according to the disclosure can quickly switch from the two-wheel drive to the four-wheel drive depending on the situation.

BRIEF DESCRIPTION OF THE DRAWINGS

FIG. 12 is a timing chart showing changes in an estimated combined acceleration during sudden acceleration in the comparative example.

DESCRIPTION OF THE EMBODIMENTS

Figure 1:
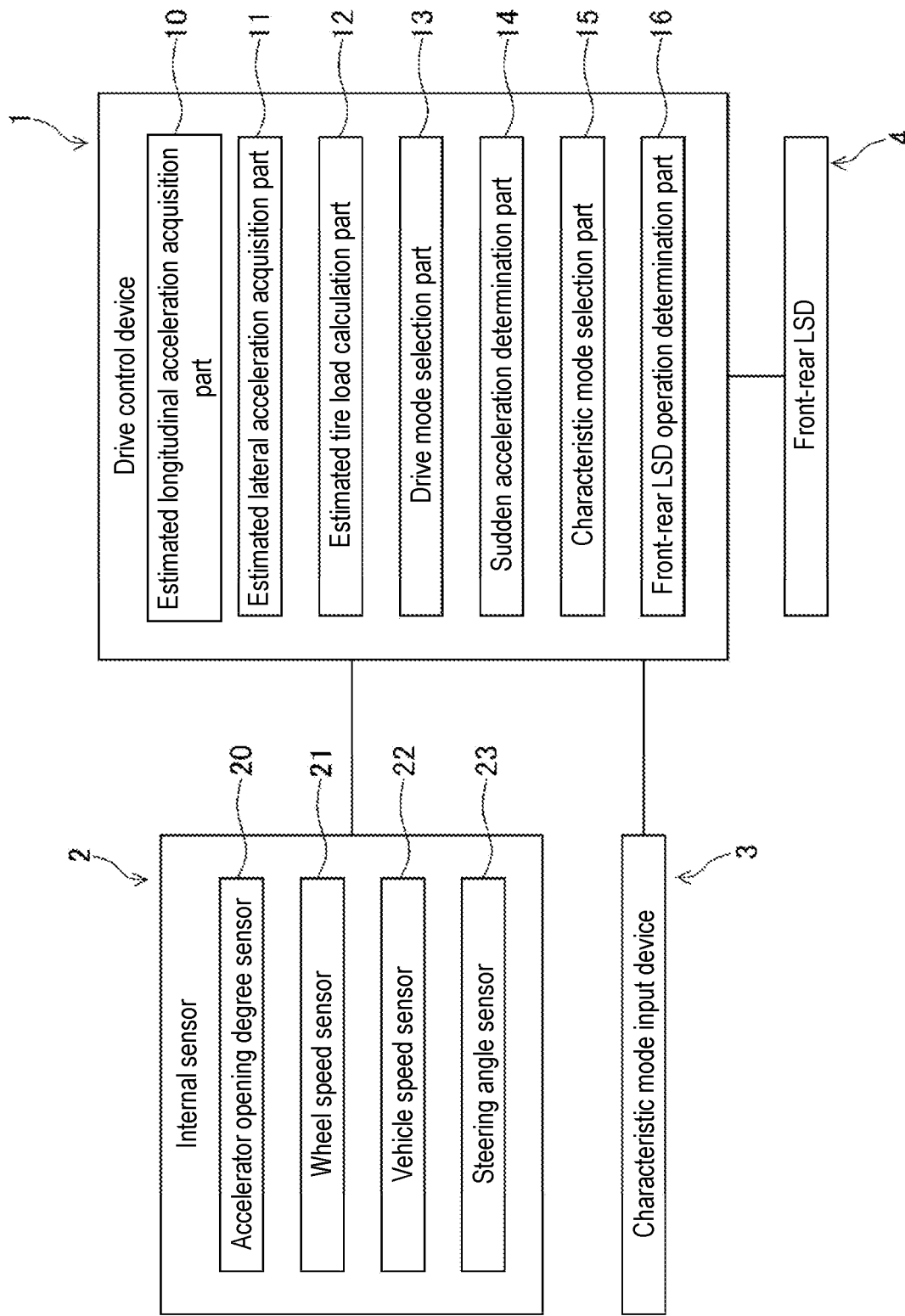
FIG. 1 is a block diagram showing a drive control device according to an embodiment.

A drive control device according to embodiments of the disclosure can quickly switch from two-wheel drive to four-wheel drive depending on the situation.

Hereinafter, exemplary embodiments will be described with reference to the drawings. The same or corresponding parts in the drawings are labeled with the same reference signs, and repeated descriptions will be omitted.

Overall Configuration

Figure 2:
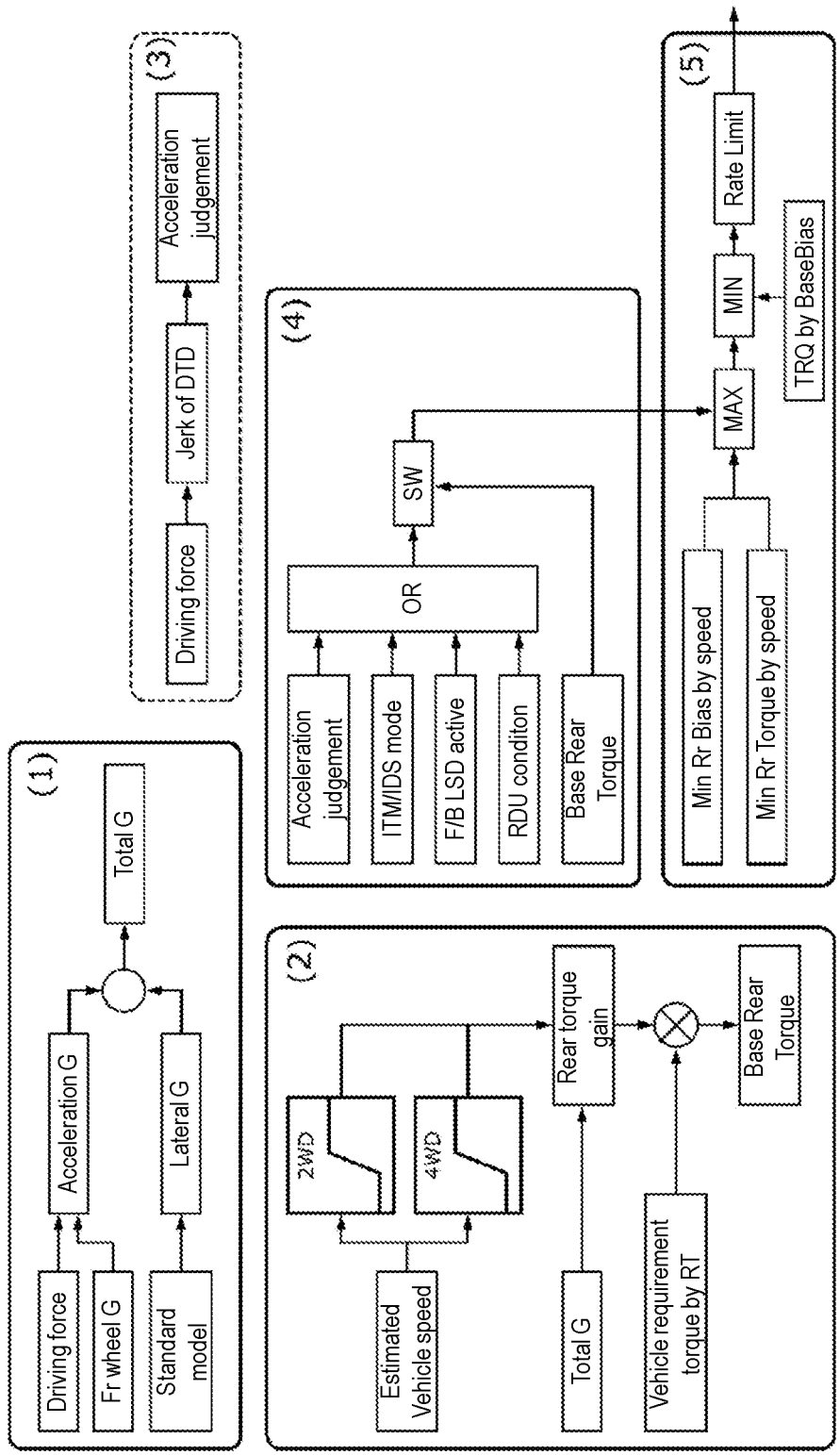
FIG. 2 is a view for illustrating a drive control logic.

FIG. 1 is a block diagram showing a drive control device 1 according to this embodiment. FIG. 2 is a view for illustrating a drive control logic. As shown in FIG. 1 and FIG. 2, the drive control device 1 is a device mounted on a vehicle and switches between two-wheel drive and four-wheel drive by adjusting a driving force distribution between main drive wheels and auxiliary drive wheels of the vehicle. In particular, even under a heavy load condition such as during towing traveling, the drive control device 1 can quickly switch to the four-wheel drive depending on the situation to improve the traveling performance and steering stability of the vehicle while securing a wide region for selecting the two-wheel drive to suppress deterioration of fuel efficiency or temperature rise of each part of the vehicle.

The "main drive wheels" are wheels among front wheels and rear wheels that are driven during the two-wheel drive. The main drive wheels are driven also during the four-wheel drive. The "auxiliary drive wheels" are wheels among the front wheels and the rear wheels that are not driven during the two-wheel drive but are driven during the four-wheel drive. Herein, the main drive wheels are the front wheels and the auxiliary drive wheels are the rear wheels. That is, the vehicle exemplified herein realizes the four-wheel drive by driving the rear wheels on the basis of the two-wheel drive which is based on front wheel drive. For example, the two-wheel drive (2WD) may be a state in which the total driving force is distributed to the main drive wheels, and the four-wheel drive (4WD) may be a state in which the driving force is distributed according to a front-rear weighted distribution ratio of the vehicle.

The drive control device 1 communicates with an internal sensor 2 mounted on the vehicle and a characteristic mode input device 3 to exchange various information. Further, the drive control device 1 acquires information associated with an operating status of a front-rear LSD 4.

As a physical configuration, the drive control device 1 is configured as a computer including a control arithmetic device, a storage device, and an input/output device. The control arithmetic device is, for example, an ECU (electronic control unit) configured by a controller such as a CPU (central processing unit) and executes arithmetic processing and performs control on the storage device and the input/output device. The storage device has, for example, a main storage device and an auxiliary storage device. The main storage device is configured by, for example, a RAM (random access memory). Further, the auxiliary storage device is configured by, for example, a ROM (read only memory). The input/output device has, for example, an input device which inputs data from the outside and sends the data to the storage device, and, for example, an output device which outputs, to the outside, a calculation result calculated by a control arithmetic part and stored in the storage device.

The drive control device 1 executes a drive control process (to described later) by, for example, reading a program stored in the ROM into the RAM and executing the program read in the RAM by the CPU. The drive control device 1 may physically have a configuration different from the configuration described above.

The internal sensor 2 is a detection device which detects various internal information during traveling of the vehicle. The internal sensor 2 includes an accelerator opening degree sensor 20, a wheel speed sensor 21, a vehicle speed sensor 22, and a steering angle sensor 23.

The accelerator opening degree sensor 20 is a device which detects a depression amount (accelerator opening degree) of an accelerator pedal. The accelerator opening degree sensor 20 is provided at the accelerator pedal and transmits information associated with the detected depression amount to the drive control device 1. The wheel speed sensor 21 is a device which detects a rotational speed (angular velocity) of the wheel. The wheel speed sensor 21 is provided at a rotating part in the drive system of the vehicle and transmits information associated with the detected rotational speed to the drive control device 1. The vehicle speed sensor 22 is a device which detects a vehicle speed of the vehicle. The vehicle speed sensor 22 may also be used as the wheel speed sensor 21. That is, the drive control device 1 may calculate the vehicle speed based on the rotational speed of the wheels detected by the wheel speed sensor 21. Further, the drive control device 1 may estimate the vehicle speed from a value of a yaw rate sensor in addition to the rotational speed of the wheels. The steering angle sensor 23 is a device which detects a steering amount (steering angle) of the steering wheel by the driver. The steering angle sensor 23 is provided at a steering shaft of the vehicle and transmits information associated with the detected steering amount to the drive control device 1.

The characteristic mode input device 3 is an input device for the driver to select a traveling characteristic of the vehicle. The characteristic mode input device 3 may be, for example, a switch or a dial provided around the driver's seat. The "traveling characteristic" may include, for example, characteristics such as an output characteristic or a response characteristic of an engine or a drive motor with respect to the accelerator opening degree of the vehicle, or a gear shift pattern of a transmission gear. The characteristic mode input device 3 may select a normal mode which realizes a normal traveling characteristic of the vehicle and a non-normal mode which realizes a traveling characteristic different from the traveling characteristic of the normal mode. The "normal mode" may be, for example, a mode (NORMAL mode) in an initial state when ignition of the vehicle is turned on. The "non-normal mode" may be another mode changed from the normal mode and may include at least one of, for example, a mode (SNOW mode) suitable for snowy road traveling, a mode (SAND mode) suitable for sandy ground traveling, a mode (MUD mode) suitable for muddy road traveling, a mode (TRAIL mode) suitable for rough road traveling, and a mode (TOW mode) suitable for towing traveling.

The front-rear LSD 4, i.e., front-rear limited slip differential, is a mechanism which limits a differential between the front wheels and the rear wheels of the vehicle. The front-rear LSD 4 controls the driving force distributed to the front wheels and the rear wheels so that the rotational speed of the front wheels and the rotational speed of the rear wheels are about the same. For example, when one of the front wheel and the rear wheel slips, the front-rear LSD 4 transmits the driving force to the other wheel. With a sensor provided at the front-rear LSD 4 or a controller which controls the front-rear LSD 4, information associated with whether the front-rear LSD 4 is operating is acquired, and the acquired information is transmitted to the drive control device 1.

Next, a functional configuration of the drive control device 1 will be described. The drive control device 1 includes an estimated longitudinal acceleration acquisition part 10, an estimated lateral acceleration acquisition part 11, an estimated tire load calculation part 12, a drive mode selection part 13, a sudden acceleration determination part 14, a characteristic mode selection part 15, and a front-rear LSD operation determination part 16.

The estimated longitudinal acceleration acquisition part 10 acquires an estimated longitudinal acceleration of the vehicle based on an estimated driving force of the vehicle and a wheel speed of the main drive wheels of the vehicle. The "estimated longitudinal acceleration" is an estimated value of a longitudinal acceleration of the vehicle to be used in drive control by the drive control device 1. More specifically, the estimated longitudinal acceleration acquisition part 10 acquires, as the estimated longitudinal acceleration, a larger value (i.e., a high select value) between longitudinal accelerations of the vehicle respectively calculated from the estimated driving force and the wheel speed.

When calculating the longitudinal acceleration of the vehicle from the estimated driving force, for example, the estimated longitudinal acceleration acquisition part 10 may acquire the estimated driving force of the vehicle from the accelerator opening degree acquired by the accelerator opening degree sensor 20 and divide the acquired estimated driving force by the vehicle weight to calculate the longitudinal acceleration. In this case, the estimated longitudinal acceleration acquisition part 10 may acquire the estimated driving force of the vehicle by combining a gear ratio of the transmission gear with a vehicle total driving force (e.g., an output torque of the engine or the drive motor) assumed from the accelerator opening degree.

Further, when calculating the longitudinal acceleration of the vehicle from the wheel speed, the estimated longitudinal acceleration acquisition part 10 may, for example, time-differentiate an angular velocity of the wheels (main drive wheels) acquired by the wheel speed sensor 21 to calculate an angular acceleration, and calculate the longitudinal acceleration as an acceleration of the vehicle according to the calculated angular acceleration. In this case, for each calculated acceleration of the wheel, the estimated longitudinal acceleration acquisition part 10 may acquire, as the longitudinal acceleration, the acceleration of the vehicle calculated assuming that the wheel is gripping the road surface (not slipping). Therefore, when the wheels (main drive wheels) are slipping, the longitudinal acceleration of the vehicle calculated from the wheel speed may be a value larger than the actual longitudinal acceleration actually occurring in the vehicle.

The estimated lateral acceleration acquisition part 11 acquires an estimated lateral acceleration of the vehicle. The "estimated lateral acceleration" is an estimated value of a lateral acceleration of the vehicle to be used in drive control by the drive control device 1. The estimated lateral acceleration acquisition part 11 may calculate the estimated lateral acceleration, for example, based on a vehicle speed acquired by the vehicle speed sensor 22 and the steering angle of the steering wheel acquired by the steering angle sensor 23. In this case, the estimated lateral acceleration acquisition part 11 may use a vehicle two-wheel model for calculating the estimated lateral acceleration.

The estimated tire load calculation part 12 calculates an estimated tire load of the main drive wheels. The "estimated tire load" is an estimated load which combines a load due to a longitudinal force and a load due to a lateral force estimated to be applied to the tire. The estimated tire load may be, for example, an estimated value of a frictional force between the tire and the road surface. The estimated tire load calculation part 12 calculates the estimated tire load of the main drive wheels based on the estimated longitudinal acceleration acquired by the estimated longitudinal acceleration acquisition part 10 and the estimated lateral acceleration acquired by the estimated lateral acceleration acquisition part 11. More specifically, the estimated tire load calculation part 12 calculates an estimated combined acceleration by combining the estimated longitudinal acceleration and the estimated lateral acceleration, and calculates the estimated tire load based on the calculated estimated combined acceleration. As will be described later, the drive control device 1 compares a magnitude relationship between the estimated tire load and a radius (two-wheel drive threshold value or four-wheel drive threshold value) of a friction circle, and switches between the two-wheel drive and the four-wheel drive based on the comparison result. Accordingly, the estimated tire load is also referred to as a two-wheel drive control amount.

The drive mode selection part 13 selects one of a two-wheel drive mode and a four-wheel drive mode in the vehicle. The "two-wheel drive mode" is a mode in which the vehicle is driven only by the main drive wheels, and by selecting the two-wheel drive mode, the vehicle is two-wheel driven. The "four-wheel drive mode" is a mode in which the vehicle is driven by both the main drive wheels and the auxiliary drive wheel, and by selecting the four-wheel drive mode, the vehicle is four-wheel driven. In the four-wheel drive mode, a torque distributed to the auxiliary drive wheels among the main drive wheels and the auxiliary drive wheels is equal to or higher than a preset minimum torque. That is, when the four-wheel drive mode is selected, the driving force is distributed between the main drive wheels and the auxiliary drive wheels so that the auxiliary drive wheels are always driven at the minimum torque or higher.

Figure 3:
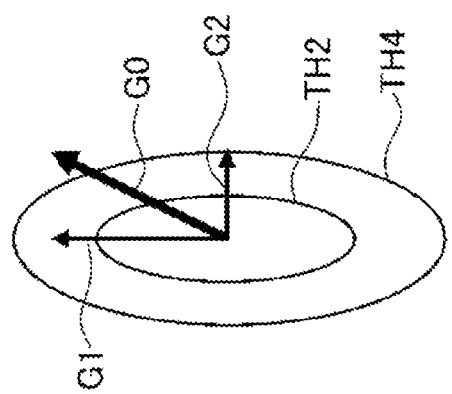
FIG. 3 is a view showing friction circles and an estimated tire load.

FIG. 3 is a view showing friction circles and an estimated tire load. As shown in FIG. 3, the drive mode selection part 13 stores in advance a two-wheel drive threshold value TH2 and a four-wheel drive threshold value TH4 which constitute friction circles. An estimated tire load G0 is represented as a vector obtained by combining a tire load G1 in a vehicle longitudinal direction based on the estimated longitudinal acceleration and a tire load G2 in a vehicle lateral direction based on the estimated lateral acceleration. The drive mode selection part 13 compares a magnitude relationship between the estimated tire load G0 calculated by the estimated tire load calculation part 12 and a radius (the two-wheel drive threshold value TH2 or the four-wheel drive threshold value TH4) of the preset friction circle, and selects one of the two-wheel drive mode and the four-wheel drive mode based on the comparison result. Further, the friction circle has a smaller diameter in the lateral direction with respect to the straight traveling direction. Accordingly, when turning, the estimated lateral acceleration may easily exceed the four-wheel drive threshold value TH4, and as a result, it is easy to switch from the two-wheel drive to the four-wheel drive.

Herein, the "two-wheel drive threshold value" is a threshold value, and when the estimated tire load G0 calculated by the estimated tire load calculation part 12 is lower than this threshold value, the two-wheel drive mode is selected by the drive mode selection part 13. In other words, when the estimated tire load G0 calculated by the estimated tire load calculation part 12 is lower than the two-wheel drive threshold value TH2, the drive mode selection part 13 selects the two-wheel drive mode in the vehicle. The two-wheel drive threshold value TH2 constitutes a friction circle (friction ellipse).

The "four-wheel drive threshold value" is a threshold value, and when the estimated tire load G0 calculated by the estimated tire load calculation part 12 exceeds this threshold value, the four-wheel drive mode is selected by the drive mode selection part 13. In other words, when the estimated tire load G0 calculated by the estimated tire load calculation part 12 exceeds the four-wheel drive threshold value TH4, the drive mode selection part 13 selects the four-wheel drive mode in the vehicle. The four-wheel drive threshold value TH4 constitutes a friction circle (friction ellipse). The four-wheel drive threshold value TH4 is a value larger than the two-wheel drive threshold value TH2, and the friction circle constituted by the four-wheel drive threshold value TH4 has a larger diameter than the friction circle constituted by the two-wheel drive threshold value TH2. That is, the friction circle constituted by the four-wheel drive threshold value TH4 includes the friction circle constituted by the two-wheel drive threshold value TH2. Accordingly, the drive mode selection part 13 is prevented from frequently switching between the two-wheel drive mode and the four-wheel drive mode.

Figure 4:
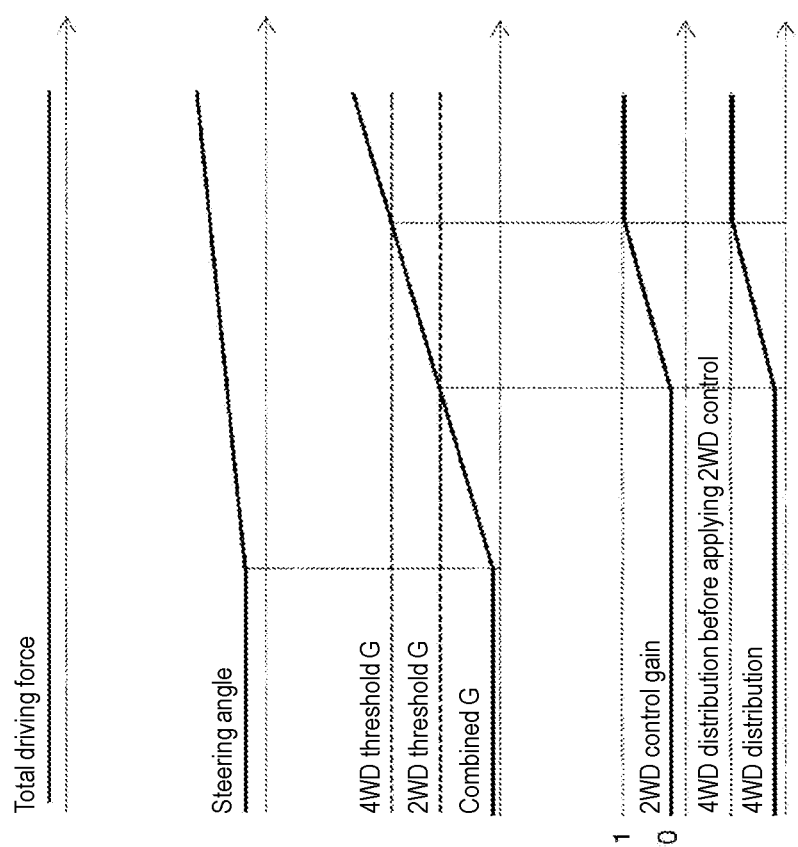
FIG. 4 is a timing chart showing changes in an estimated combined acceleration during turning.

As shown in FIG. 4, the friction circle may not be reduced in diameter in the lateral direction, but instead, the estimated lateral acceleration may be multiplied by a gain larger than 1 time. FIG. 4 is a timing chart showing changes in an estimated combined acceleration during turning. FIG. 4 shows, from top to bottom, a total driving force of the vehicle, a steering angle, a 4WD threshold G, a 2WD threshold G, a combined G, a 2WD control gain, and a driving force distribution between the main drive wheels and the auxiliary drive wheels. The total driving force of the vehicle is constant, and the acceleration (2WD threshold G) corresponding to the two-wheel drive threshold value and the acceleration (4WD threshold G) corresponding to the four-wheel drive threshold value are preset. Further, the combined G corresponds to the estimated combined acceleration.

In FIG. 4, when the steering is started, with the estimated lateral acceleration starting to increase, the estimated combined acceleration starts to increase. Herein, since the estimated lateral acceleration is multiplied by a gain larger than 1 time, the estimated combined acceleration also easily increases, so the four-wheel drive threshold value is easily exceeded. As a result, the distribution of the driving force to the auxiliary drive wheels easily increases. Herein, the 2WD control gain associated with the driving force distribution ratio to the auxiliary drive wheels starts to increase (i.e., a transition state from the two-wheel drive to the four-wheel drive) when the estimated combined acceleration exceeds the two-wheel drive threshold value, and completely transitions to the four-wheel drive when the four-wheel drive threshold value is exceeded.

When the vehicle is in a predetermined situation (a situation that satisfies a prohibition condition for the two-wheel drive), the drive mode selection part 13 is prohibited from selecting the two-wheel drive mode (i.e., selecting the four-wheel drive mode). For example, when it is determined by the sudden acceleration determination part 14 (to be described later) that the vehicle is about to accelerate suddenly, the drive mode selection part 13 is prohibited from selecting the two-wheel drive mode in the vehicle. Further, when the non-normal mode is selected by the characteristic mode selection part 15 (to be described later), the drive mode selection part 13 is prohibited from selecting the two-wheel drive mode in the vehicle. Further, when it is determined by the front-rear LSD operation determination part 16 (to be described later) that the front-rear LSD 4 is operating, the drive mode selection part 13 is prohibited from selecting the two-wheel drive mode in the vehicle.

The sudden acceleration determination part 14 determines whether the vehicle is about to accelerate suddenly based on the estimated driving force. For example, the sudden acceleration determination part 14 determines whether the vehicle is about to accelerate suddenly based on the estimated driving force of the vehicle acquired by the estimated longitudinal acceleration acquisition part 10. Specifically, the sudden acceleration determination part 14 determines whether the vehicle is about to accelerate suddenly based on a differential value of the longitudinal acceleration of the vehicle calculated from the estimated driving force. More specifically, the sudden acceleration determination part 14 determines whether the vehicle is about to accelerate suddenly by comparing the differential value of the longitudinal acceleration of the vehicle with a predetermined threshold value.

Figure 5:
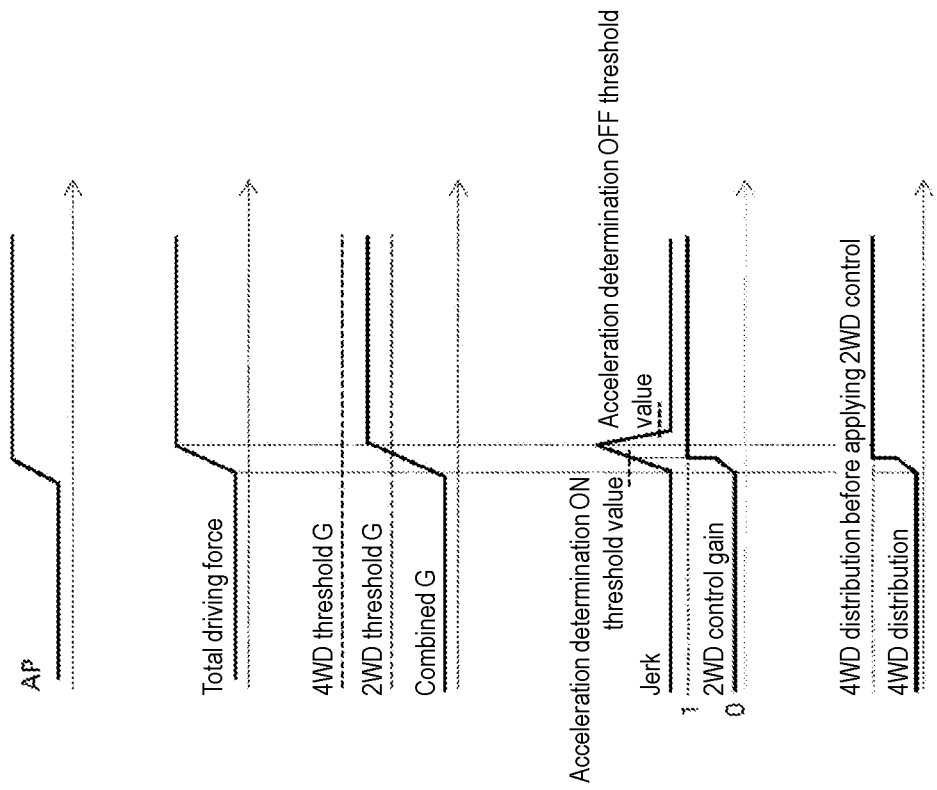
FIG. 5 is a timing chart showing changes in an estimated combined acceleration during sudden acceleration.

FIG. 5 is a timing chart showing changes in an estimated combined acceleration during sudden acceleration. FIG. 5 shows, from top to bottom, an accelerator opening degree (AP), a total driving force of the vehicle, a 4WD threshold G, a 2WD threshold G, a combined G, a differential value (i.e., longitudinal jerk) of a longitudinal acceleration of the vehicle, a 2WD control gain, and a driving force distribution between the main drive wheels and the auxiliary drive wheels. As shown in FIG. 5, when the differential value of the longitudinal acceleration of the vehicle exceeds a predetermined value (acceleration determination ON threshold value in FIG. 5), the vehicle completely (forcibly) transitions to the four-wheel drive.

The characteristic mode selection part 15 selects a characteristic mode of a traveling characteristic in the vehicle. More specifically, the characteristic mode selection part 15 selects one of a normal mode and a non-normal mode in the vehicle. Specifically, the characteristic mode selection part 15 selects the characteristic mode (the normal mode or the non-normal mode) corresponding to the traveling characteristic inputted to the characteristic mode input device 3 by the driver.

The front-rear LSD operation determination part 16 determines whether the front-rear LSD 4 is operating in the vehicle. Specifically, with a sensor provided at the front-rear LSD 4 or a controller which controls the front-rear LSD 4, information associated with whether the front-rear LSD 4 is operating is acquired, and the acquired information is transmitted to the front-rear LSD operation determination part 16.

With the above configuration, the drive control device 1 realizes the following drive control logic. As shown in (1) of FIG. 2, based on an estimated driving force (driving force) of the vehicle and an estimated main drive wheel acceleration (Fr wheel G) calculated from the wheel speed of the main drive wheels of the vehicle, an estimated longitudinal acceleration (acceleration G) of the vehicle is acquired. Further, an estimated lateral acceleration (lateral G) of the vehicle is calculated using a vehicle two-wheel model (standard model). Then, a square root (combined value) of a sum of squares of the estimated longitudinal acceleration and the estimated lateral acceleration is acquired as an estimated combined acceleration (estimated tire load) (total G).

Subsequently, as shown in (2) of FIG. 2, values of the two-wheel drive threshold value (2WD) and the four-wheel drive threshold value (4WD) are determined according to an acquired vehicle speed (estimated vehicle speed). Then, the two-wheel drive threshold value and the four-wheel drive threshold value (friction circle) are compared with the estimated combined acceleration (estimated tire load) (total G), and a 2WD control gain (rear torque gain) is determined. Afterwards, as a value obtained by multiplying a drive torque (vehicle requirement torque by rear torque (RT)) of the auxiliary drive wheels required from the viewpoint of traveling performance by the 2WD control gain (rear torque gain), a drive torque (base rear torque) of the auxiliary drive wheels is determined.

Subsequently, as shown in (3) of FIG. 2, the estimated driving force (driving force) of the vehicle is differentiated to calculate a differential value (i.e., longitudinal jerk) (jerk of drive torque at driveshaft (DTD)) of the longitudinal acceleration of the vehicle. Then, it is determined whether the vehicle is about to accelerate suddenly (acceleration judgement) based on the jerk.

Subsequently, as shown in (4) of FIG. 2, it is determined whether a prohibition condition for the two-wheel drive is satisfied. Specifically, it is determined whether at least one of the following conditions is satisfied (OR): whether the vehicle is about to accelerate suddenly (acceleration judgement), whether the characteristic mode of the traveling characteristic is the non-normal mode (Intelligent Traction Management (ITM)/Integrated Dynamic System (IDS) mode), whether the front-rear LSD 4 is operating (F/B LSD active), and whether the rear drive unit (RDU) oil temperature is lower than a predetermined value (RDU condition). Then, if none of the conditions is satisfied, the drive torque (base rear torque) of the auxiliary drive wheels is adopted, and if at least one of the conditions is satisfied, a port switch (SW) is controlled to prohibit the two-wheel drive.

Subsequently, as shown in (5) of FIG. 2, a maximum value among a lower limit value (min Rr bias by speed) in the distribution ratio dimension, a lower limit value (min Rr torque by speed) in the torque dimension, and an output value from the port switch (SW) is acquired. Accordingly, the auxiliary drive wheels have a torque equal to or higher than a minimum torque in the four-wheel drive mode. Then, a minimum value between this maximum value and a drive torque (torque (TRQ) by base bias, i.e., vehicle requirement torque by RT) of the auxiliary drive wheels required from the viewpoint of traveling performance is acquired. Further, a rate limit (rate limit) for suppressing occurrence of a shock due to a sudden change in a control output value is applied to this minimum value. According to the above, the drive torque distributed to the auxiliary drive wheels in the four-wheel drive mode is determined.

Drive Control

Figure 6:
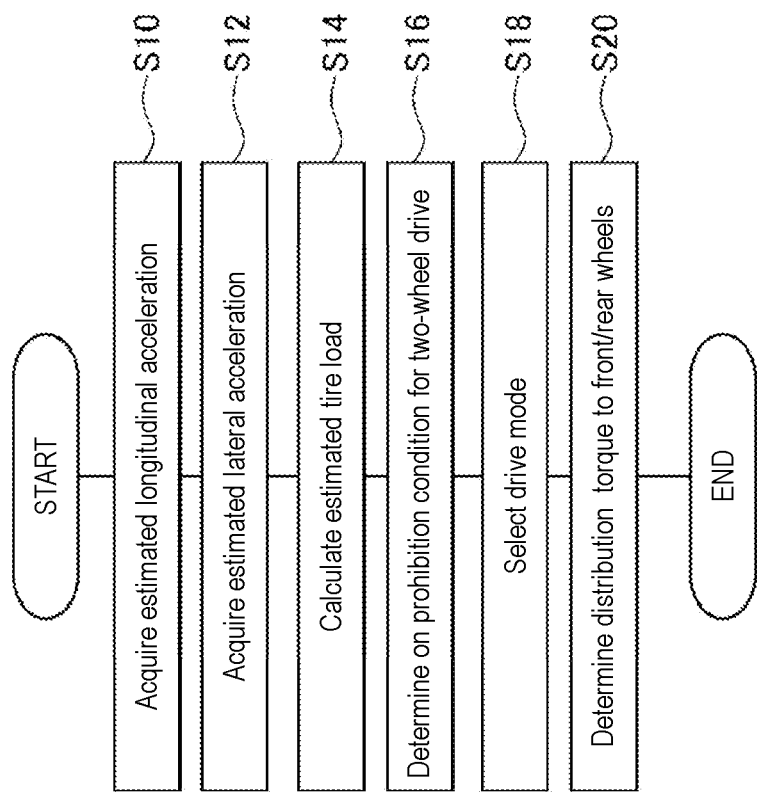
FIG. 6 is a flowchart of drive control.

The drive control executed by the drive control device 1 will be described. FIG. 6 is a flowchart of drive control. The drive control shown in FIG. 6 is a control for switching between the two-wheel drive and the four-wheel drive by adjusting a driving force distribution between the main drive wheels and the auxiliary drive wheels of the vehicle. In particular, the drive control is a control which enables quick switching to the four-wheel drive depending on the situation while securing a wide region for selecting the two-wheel drive.

In step S10, the estimated longitudinal acceleration acquisition part 10 of the drive control device 1 acquires an estimated longitudinal acceleration of the vehicle based on an estimated driving force of the vehicle and a wheel speed of the main drive wheels of the vehicle. More specifically, the estimated longitudinal acceleration acquisition part 10 acquires, as the estimated longitudinal acceleration, a larger value (i.e., a high select value) between longitudinal accelerations of the vehicle calculated respectively from the estimated driving force and the wheel speed. When calculating the longitudinal acceleration of the vehicle from the estimated driving force, the estimated longitudinal acceleration acquisition part 10 acquires, for example, the estimated driving force of the vehicle from an accelerator opening degree acquired by the accelerator opening degree sensor 20, and calculates the longitudinal acceleration by dividing the acquired estimated driving force by the vehicle weight. Further, when calculating the longitudinal acceleration of the vehicle from the wheel speed, the estimated longitudinal acceleration acquisition part 10 calculates, for example, an angular acceleration by time-differentiating an angular velocity of the wheel (main drive wheel) acquired by the wheel speed sensor 21, and calculates the longitudinal acceleration as the acceleration of the vehicle according to the calculated angular acceleration. Afterwards, the drive control proceeds to step S12.

In step S12, the estimated lateral acceleration acquisition part 11 of the drive control device 1 acquires an estimated lateral acceleration of the vehicle. More specifically, the estimated lateral acceleration acquisition part 11 calculates the estimated lateral acceleration based on, for example, a vehicle speed acquired by the vehicle speed sensor 22 and a steering angle of the steering wheel acquired by the steering angle sensor 23. Herein, the estimated lateral acceleration acquisition part 11 uses a vehicle two-wheel model for calculating the estimated lateral acceleration. Afterwards, the drive control proceeds to step S14.

In step S14, the estimated tire load calculation part 12 of the drive control device 1 calculates an estimated tire load of the main drive wheels. More specifically, the estimated tire load calculation part 12 calculates an estimated combined acceleration by combining the estimated longitudinal acceleration and the estimated lateral acceleration, and calculates the estimated tire load based on the calculated estimated combined acceleration. Afterwards, the drive control proceeds to step S16.

In step S16, the drive mode selection part 13 of the drive control device 1 determines whether the vehicle is in a predetermined situation (a situation which satisfies a prohibition condition for the two-wheel drive). The prohibition condition for the two-wheel drive includes, for example, determining, by the sudden acceleration determination part 14, that the vehicle is about to accelerate suddenly, selecting, by the characteristic mode selection part 15, the non-normal mode, or determining, by the front-rear LSD operation determination part 16, that the front-rear LSD 4 is operating. Afterwards, the drive control proceeds to step S18.

In step S18, the drive mode selection part 13 of the drive control device 1 selects one of a two-wheel drive mode and a four-wheel drive mode in the vehicle. If it is determined in step S16 that the vehicle is in a situation satisfying the prohibition condition for the two-wheel drive, the drive mode selection part 13 selects the four-wheel drive mode. On the other hand, if it is not determined in step S16 that the vehicle is in a situation satisfying the prohibition condition for the two-wheel drive, the drive mode selection part 13 compares a magnitude relationship between the estimated tire load calculated by the estimated tire load calculation part 12 and a radius (two-wheel drive threshold value or four-wheel drive threshold value) of a preset friction circle, and selects one of the two-wheel drive mode and the four-wheel drive mode based on the comparison result. Afterwards, the drive control proceeds to step S20.

In step S20, the drive mode selection part 13 of the drive control device 1 determines a distribution of the drive torque (distributed torque) respectively to the main drive wheels and the auxiliary drive wheels. Specifically, the drive mode selection part 13 determines the distribution of the drive torque to be a torque distribution according to the 2WD control gain. At this time, in the four-wheel drive mode, the drive mode selection part 13 sets the torque distributed to the auxiliary drive wheels to a preset minimum torque or higher. According to the above, the drive control is completed.

Actions and Effects

Figure 7:
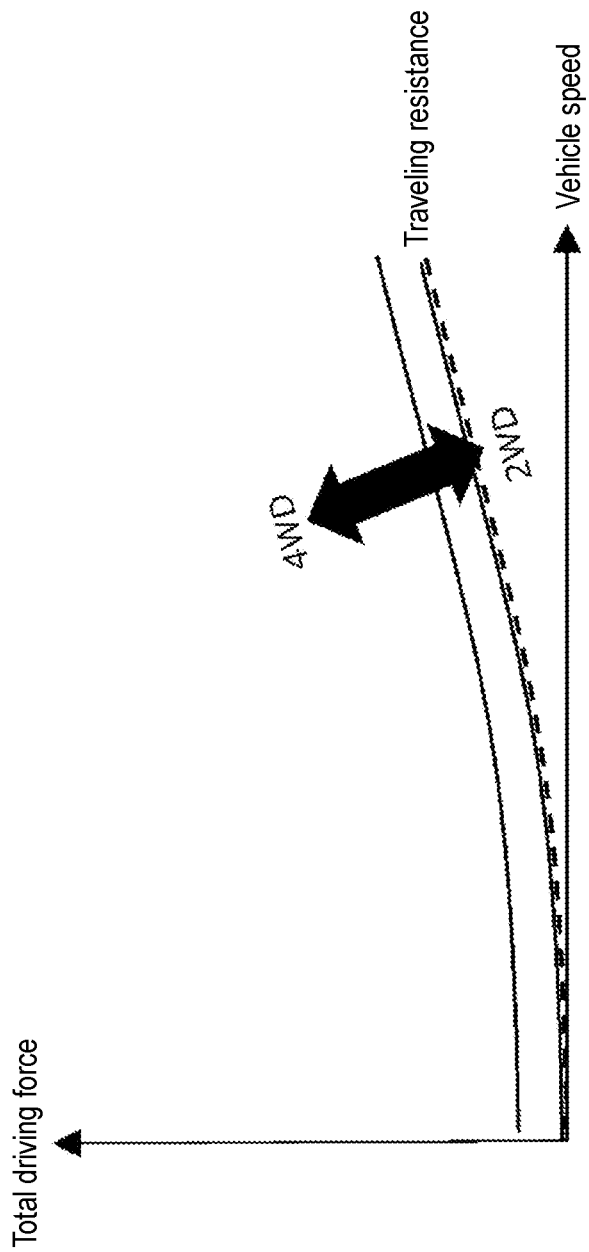
FIG. 7 is a view showing a relationship between a vehicle speed and a two-wheel drive threshold value and a four-wheel drive threshold value in cruise traveling in a comparative example.
Figure 8:
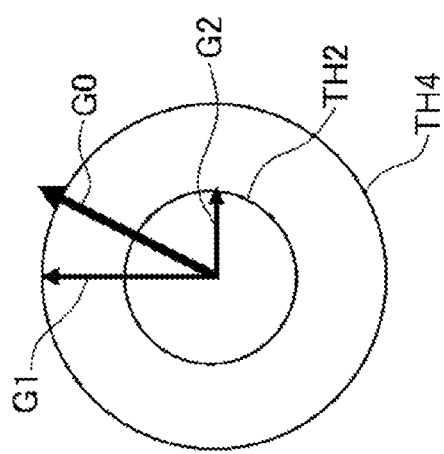
FIG. 8 is a view showing friction circles and an estimated tire load in cruise traveling in the comparative example.
Figure 9:
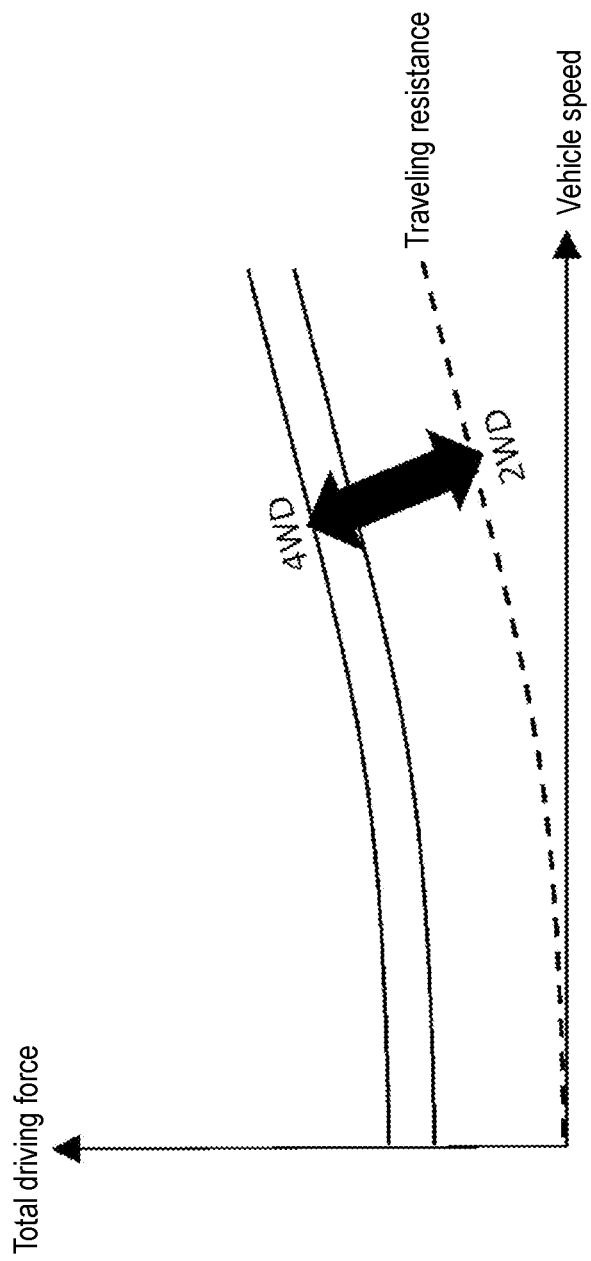
FIG. 9 is a view showing a relationship between a vehicle speed and a two-wheel drive threshold value and a four-wheel drive threshold value under a heavy load condition in the comparative example.
Figure 10:
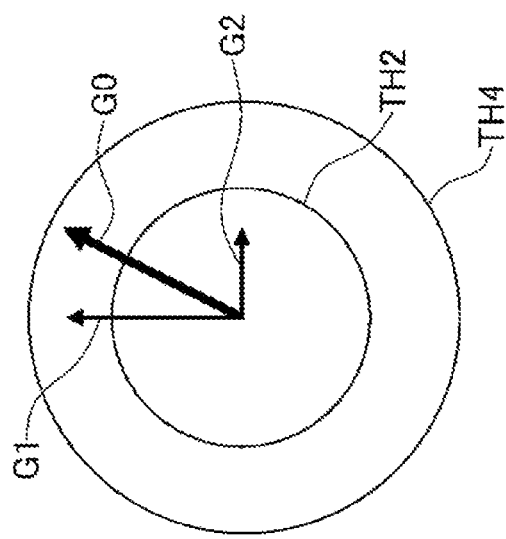
FIG. 10 is a view showing friction circles and an estimated tire load under a heaving load condition in the comparative example.
Figure 11:
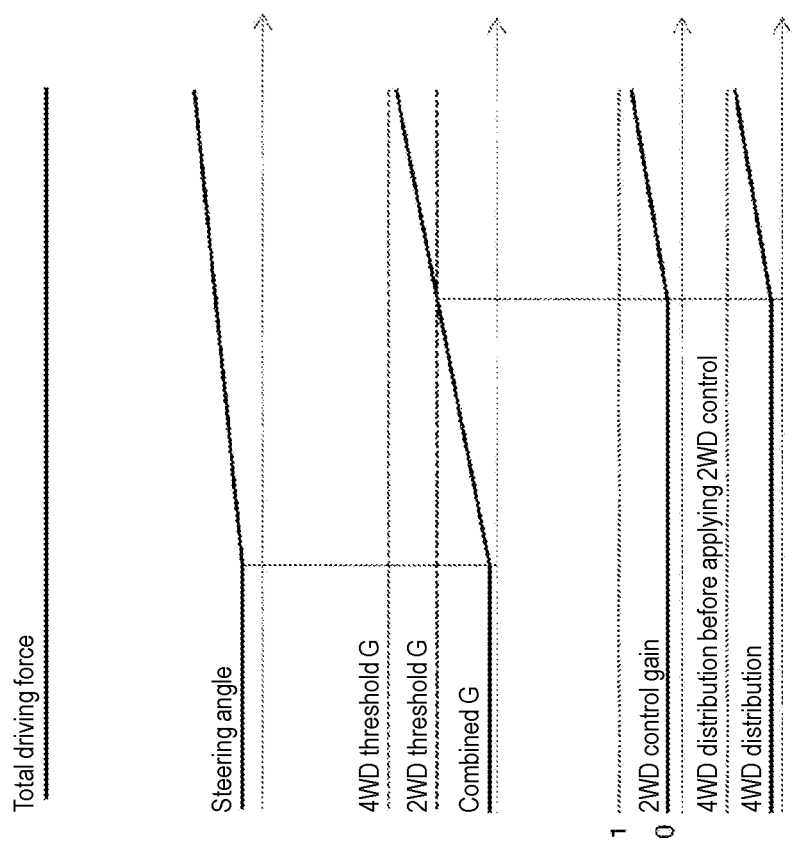
FIG. 11 is a timing chart showing changes in an estimated combined acceleration during turning in the comparative example.

Herein, a conventional drive control device will be described as a comparative example with reference to FIG. 7 to FIG. 12. FIG. 7 is a view showing a relationship between a vehicle speed and a two-wheel drive threshold value and a four-wheel drive threshold value in cruise traveling in the comparative example. FIG. 8 is a view showing friction circles and an estimated tire load in cruise traveling in the comparative example. FIG. 9 is a view showing a relationship between a vehicle speed and a two-wheel drive threshold value and a four-wheel drive threshold value under a heavy load condition in the comparative example. FIG. 10 is a view showing friction circles and an estimated tire load under a heaving load condition in the comparative example. FIG. 11 is a timing chart showing changes in an estimated combined acceleration during turning in the comparative example. FIG. 12 is a timing chart showing changes in an estimated combined acceleration during sudden acceleration in the comparative example.

In the comparative example, as shown in FIG. 7 and FIG. 8, in the cruise traveling region, it is easy to relatively suitably set a magnitude relationship between an estimated tire load G0 and a radius (two-wheel drive threshold value TH2 or four-wheel drive threshold value TH4) of the friction circlet, and it is possible to switch between the two-wheel drive and the four-wheel drive at a relatively suitable timing. On the other hand, as shown in FIG. 9 and FIG. 10, under a heavy load condition such as during towing traveling, it is necessary to secure a wide region for selecting the two-wheel drive to suppress deterioration of fuel efficiency or temperature rise of each part of the vehicle. Therefore, it is difficult for the estimated tire load G0 to exceed the four-wheel drive threshold value TH4, and there is concern that the vehicle would not switch to the four-wheel drive at a suitable timing.

According to FIG. 11, also in the comparative example, as in the drive control device 1, when the steering is started, with the estimated lateral acceleration starting to increase, the estimated combined acceleration starts to increase. However, in the comparative example, since the estimated lateral acceleration is not multiplied by a gain, the estimated combined acceleration does not easily increase accordingly, and it is difficult to exceed the four-wheel drive threshold value. As a result, it is difficult for the distribution of the driving force to the auxiliary drive wheels to increase. Further, according to FIG. 12, since control is not executed to completely transition to the four-wheel drive when the differential value (i.e., longitudinal jerk) of the longitudinal acceleration of the vehicle exceeds a predetermined value, there is concern that the vehicle would not switch to the four-wheel drive at a suitable timing during sudden acceleration of the vehicle.

In contrast, the drive control device 1 includes an estimated longitudinal acceleration acquisition part 10, an estimated lateral acceleration acquisition part 11, an estimated tire load calculation part 12, and a drive mode selection part 13. The estimated longitudinal acceleration acquisition part 10 acquires an estimated longitudinal acceleration of a vehicle based on an estimated driving force of the vehicle and a wheel speed of main drive wheels of the vehicle. The estimated lateral acceleration acquisition part 11 acquires an estimated lateral acceleration of the vehicle. The estimated tire load calculation part 12 calculates an estimated tire load of the main drive wheels based on the estimated longitudinal acceleration acquired by the estimated longitudinal acceleration acquisition part 10 and the estimated lateral acceleration acquired by the estimated lateral acceleration acquisition part 11. The drive mode selection part 13 selects one of a two-wheel drive mode driven only by the main drive wheels and a four-wheel drive mode driven by both the main drive wheels and auxiliary drive wheels in the vehicle. When the estimated tire load calculated by the estimated tire load calculation part 12 is lower than a two-wheel drive threshold value, the drive mode selection part 13 selects the two-wheel drive mode in the vehicle.

According to the drive control device 1, the estimated longitudinal acceleration of the vehicle is acquired based on not only the estimated driving force of the vehicle but also the wheel speed of the main drive wheels. Then, when the estimated tire load of the main drive wheels acquired by combining the estimated longitudinal acceleration with the estimated lateral acceleration is lower than the two-wheel drive threshold value, the two-wheel drive is selected. That is, when the estimated driving force of the vehicle is relatively small and, for example, a situation such as slipping of the main drive wheels does not occur, the two-wheel drive is selected. In other words, even when the estimated driving force of the vehicle is relatively small, the four-wheel drive is selected, for example, in a situation such as slipping of the main drive wheels. Therefore, it is accurately determined whether the two-wheel drive should be selected or the four-wheel drive should be selected. As a result, it is possible to quickly switch from the two-wheel drive to the four-wheel drive depending on the situation.

In the drive control device 1, when the estimated tire load calculated by the estimated tire load calculation part 12 exceeds a four-wheel drive threshold value, the drive mode selection part 13 selects the four-wheel drive mode in the vehicle. Accordingly, even when the estimated driving force of the vehicle is relatively small, the four-wheel drive is selected, for example, in a situation such as slipping of the main drive wheels. Therefore, the above actions and effects of the drive control device 1 are suitably exerted.

In the drive control device 1, each of the two-wheel drive threshold value and the four-wheel drive threshold value constitutes a friction circle. Accordingly, the drive control device 1 which exerts the above actions and effects is concretely realized.

In the drive control device 1, the estimated longitudinal acceleration acquisition part 10 acquires, as the estimated longitudinal acceleration, a larger value between longitudinal accelerations of the vehicle respectively calculated from the estimated driving force and the wheel speed. Accordingly, even when the estimated driving force of the vehicle is relatively small, the four-wheel drive is more reliably selected, for example, in a situation such as slipping of the main drive wheels.

The drive control device 1 includes a sudden acceleration determination part 14 which determines whether the vehicle is about to accelerate suddenly based on the estimated driving force. When the sudden acceleration determination part 14 determines that the vehicle is about to accelerate suddenly, the drive mode selection part 13 is prohibited from selecting the two-wheel drive mode in the vehicle. Accordingly, it is possible to more reliably select the four-wheel drive during sudden acceleration, which is a situation requiring higher traveling performance and steering stability.

In the drive control device 1, the sudden acceleration determination part 14 determines whether the vehicle is about to accelerate suddenly based on a differential value of a longitudinal acceleration of the vehicle calculated from the estimated driving force. Accordingly, it is possible to accurately determine whether the vehicle is about to accelerate suddenly.

The drive control device 1 includes a characteristic mode selection part 15 which selects one of a normal mode that realizes a normal traveling characteristic and a non-normal mode that realizes a traveling characteristic different from a traveling characteristic of the normal mode in the vehicle. When the non-normal mode is selected by the characteristic mode selection part 15, the drive mode selection part 13 is prohibited from selecting the two-wheel drive mode in the vehicle. Accordingly, it is possible to more reliably select the four-wheel drive when a traveling characteristic different from the normal traveling characteristic is applied.

The drive control device 1 includes a front-rear LSD operation determination part 16 which determines whether a front-rear LSD 4 is operating in the vehicle. When it is determined by the front-rear LSD operation determination part 16 that the front-rear LSD 4 is operating, the drive mode selection part 13 is prohibited from selecting the two-wheel drive mode in the vehicle. Accordingly, it is possible to more reliably select the four-wheel drive when the front-rear LSD 4 is operating, which is a situation requiring higher traveling performance and steering stability.

In the drive control device 1, in the four-wheel drive mode, a torque distributed to the auxiliary drive wheels among the main drive wheels and the auxiliary drive wheels is equal to or higher than a preset minimum torque. Accordingly, it is easy to maintain sufficient traveling performance and steering stability when the four-wheel drive is selected.

In the drive control device 1, the main drive wheels are front wheels, and the auxiliary drive wheels are rear wheels. Accordingly, in a vehicle that realizes the four-wheel drive by also driving the rear wheels on the basis of the two-wheel drive which is based on front-wheel drive, the drive control device 1 which exerts the above actions and effects is concretely realized.

Modification

The above embodiment may be implemented in various forms modified or improved based on the knowledge of those skilled in the art.

For example, in the above embodiment, the main drive wheels are front wheels and the auxiliary drive wheels are rear wheels. However, the main drive wheels may be rear wheels and the auxiliary drive wheels may be front wheels. That is, the vehicle may realize four-wheel drive by driving the front wheels on the basis of the two-wheel drive by rear-wheel drive.

What is claimed is:

1. A drive control device comprising:
a processor configured to function as:
an estimated longitudinal acceleration acquisition part which acquires an estimated longitudinal acceleration of a vehicle based on an estimated driving force of the vehicle and a wheel speed of main drive wheels of the vehicle;
an estimated lateral acceleration acquisition part which acquires an estimated lateral acceleration of the vehicle;
an estimated tire load calculation part which calculates an estimated tire load of the main drive wheels based on the estimated longitudinal acceleration acquired by the estimated longitudinal acceleration acquisition part and the estimated lateral acceleration acquired by the estimated lateral acceleration acquisition part; and
a drive mode selection part which selects one of a two-wheel drive mode driven only by the main drive wheels and a four-wheel drive mode driven by both the main drive wheels and auxiliary drive wheels in the vehicle,
wherein when the estimated tire load calculated by the estimated tire load calculation part is lower than a two-wheel drive threshold value, the drive mode selection part selects the two-wheel drive mode in the vehicle,
wherein the estimated longitudinal acceleration acquisition part acquires a first longitudinal acceleration of the vehicle calculated from the estimated driving force of the vehicle,
wherein the estimated longitudinal acceleration acquisition part acquires a second longitudinal acceleration of the vehicle calculated from the wheel speed of main drive wheels of the vehicle,
wherein the estimated longitudinal acceleration acquisition part compares the first longitudinal acceleration and the second longitudinal acceleration, and acquires a larger value between the first longitudinal acceleration and the second longitudinal acceleration as the estimated longitudinal acceleration.

2. The drive control device according to claim 1, wherein when the estimated tire load calculated by the estimated tire load calculation part exceeds a four-wheel drive threshold value, the drive mode selection part selects the four-wheel drive mode in the vehicle.

3. The drive control device according to claim 2, wherein each of the two-wheel drive threshold value and the four-wheel drive threshold value constitutes a friction circle.

4. The drive control device according to claim 1, comprising a sudden acceleration determination part which determines whether the vehicle is about to accelerate suddenly based on the estimated driving force,
wherein when the sudden acceleration determination part determines that the vehicle is about to accelerate suddenly, the drive mode selection part is prohibited from selecting the two-wheel drive mode in the vehicle.

5. The drive control device according to claim 2, comprising a sudden acceleration determination part which determines whether the vehicle is about to accelerate suddenly based on the estimated driving force,
wherein when the sudden acceleration determination part determines that the vehicle is about to accelerate suddenly, the drive mode selection part is prohibited from selecting the two-wheel drive mode in the vehicle.

6. The drive control device according to claim 3, comprising a sudden acceleration determination part which determines whether the vehicle is about to accelerate suddenly based on the estimated driving force,
wherein when the sudden acceleration determination part determines that the vehicle is about to accelerate suddenly, the drive mode selection part is prohibited from selecting the two-wheel drive mode in the vehicle.

7. The drive control device according to claim 4, wherein the sudden acceleration determination part determines whether the vehicle is about to accelerate suddenly based on a differential value of a longitudinal acceleration of the vehicle calculated from the estimated driving force.

8. The drive control device according to claim 1, comprising a characteristic mode selection part which selects one of a normal mode that realizes a normal traveling characteristic and a non-normal mode that realizes a traveling characteristic different from a traveling characteristic of the normal mode in the vehicle,
wherein when the non-normal mode is selected by the characteristic mode selection part, the drive mode selection part is prohibited from selecting the two-wheel drive mode in the vehicle.

9. The drive control device according to claim 2, comprising a characteristic mode selection part which selects one of a normal mode that realizes a normal traveling characteristic and a non-normal mode that realizes a traveling characteristic different from a traveling characteristic of the normal mode in the vehicle,
wherein when the non-normal mode is selected by the characteristic mode selection part, the drive mode selection part is prohibited from selecting the two-wheel drive mode in the vehicle.

10. The drive control device according to claim 3, comprising a characteristic mode selection part which selects one of a normal mode that realizes a normal traveling characteristic and a non-normal mode that realizes a traveling characteristic different from a traveling characteristic of the normal mode in the vehicle,
wherein when the non-normal mode is selected by the characteristic mode selection part, the drive mode selection part is prohibited from selecting the two-wheel drive mode in the vehicle.

11. The drive control device according to claim 4, comprising a characteristic mode selection part which selects one of a normal mode that realizes a normal traveling characteristic and a non-normal mode that realizes a traveling characteristic different from a traveling characteristic of the normal mode in the vehicle,
wherein when the non-normal mode is selected by the characteristic mode selection part, the drive mode selection part is prohibited from selecting the two-wheel drive mode in the vehicle.

12. The drive control device according to claim 7, comprising a characteristic mode selection part which selects one of a normal mode that realizes a normal traveling characteristic and a non-normal mode that realizes a traveling characteristic different from a traveling characteristic of the normal mode in the vehicle,
wherein when the non-normal mode is selected by the characteristic mode selection part, the drive mode selection part is prohibited from selecting the two-wheel drive mode in the vehicle.

13. The drive control device according to claim 1, comprising a front-rear limited slip differential (LSD) operation determination part which determines whether a front-rear LSD is operating in the vehicle, wherein when it is determined by the front-rear LSD operation determination part that the front-rear LSD is operating, the drive mode selection part is prohibited from selecting the two-wheel drive mode in the vehicle.

14. The drive control device according to claim 1, wherein in the four-wheel drive mode, a torque distributed to the auxiliary drive wheels among the main drive wheels and the auxiliary drive wheels is equal to or higher than a preset minimum torque.

15. The drive control device according to claim 1, wherein the main drive wheels are front wheels, and the auxiliary drive wheels are rear wheels.

16. The drive control device according to claim 1, wherein the estimated driving force of the vehicle is acquired from an accelerator opening degree of an accel that is measured by an accelerator opening degree sensor.

* * * * *